June 5, 1923.
T. H. McDONALD
1,457,846
MEANS FOR PATCHING BLOW-OUTS IN PNEUMATIC TIRES
Filed May 17, 1922
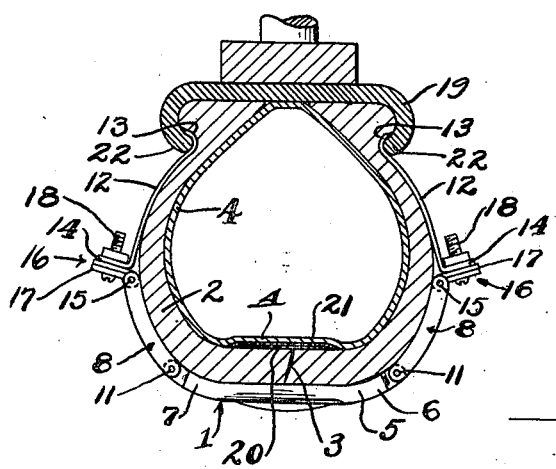
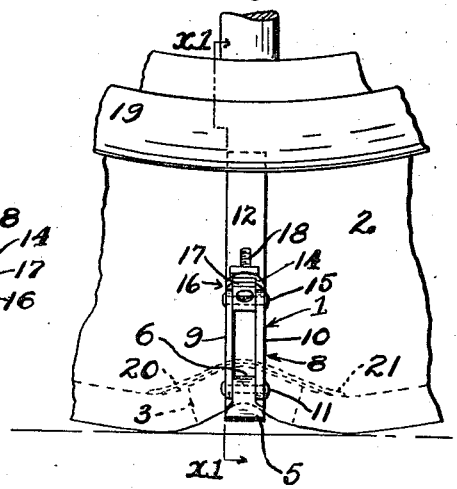
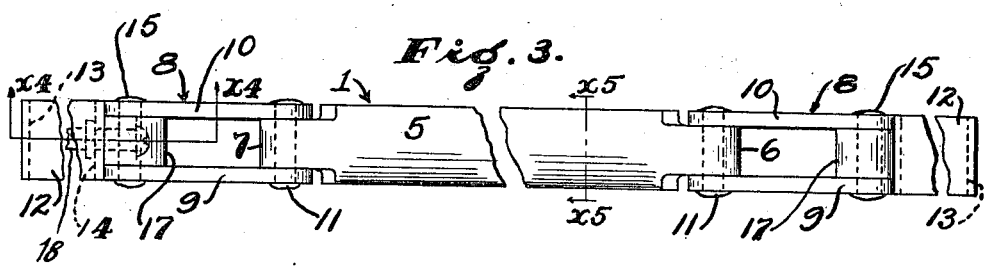
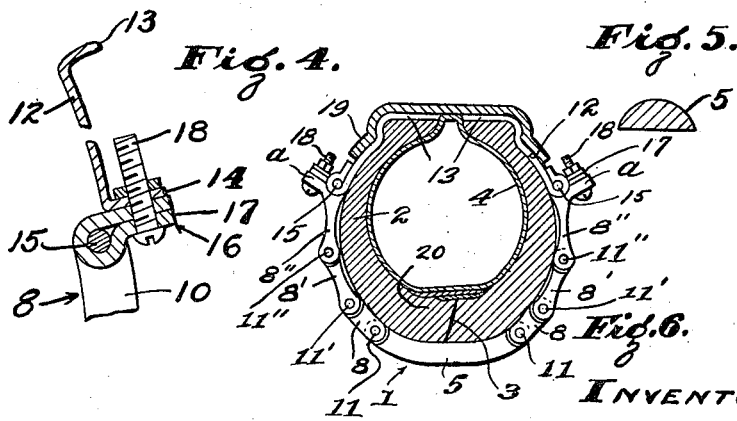
WITNESS:
Arthur T. Larrabee
INVENTOR:
THOMAS HARVEY McDONALD
by James R. Townsend
his atty.

Patented June 5, 1923.

1,457,846

UNITED STATES PATENT OFFICE.

THOMAS HARVEY McDONALD, OF ADELANTO, CALIFORNIA.

MEANS FOR PATCHING BLOW-OUTS IN PNEUMATIC TIRES.

Application filed May 17, 1922. Serial No. 561,697.

*To all whom it may concern:*

Be it known that I, THOMAS HARVEY McDONALD, a citizen of the United States, and resident of Adelanto, in the county of San Bernardino and State of California, have invented new and useful Means for Patching Blow-Outs in Pneumatic Tires, of which the following is a specification.

This invention relates particularly to means for patching blow-outs in pneumatic automobile tires and the like, and includes a novel construction of clamp for holding the casing at the blow-out. It also includes in combination with the inner tube, the tire casing having a blow-out hole, and a patch between the inflated inner tube and the casing and extending over the blow-out hole; of clamping means adapted to direct the inflation pressure to close instead of to expand the blow-out hole.

I have discovered that by applying to the tread of the tire casing at the blow-out hole, a bar of less length than the diameter of the casing, and hingedly connecting the ends of the bar with the rim the expansion caused by the inflation of the tube will be directed to close the hole and that the patch and casing will be clamped between the tube and the casing and in cooperation with such bar and expanding tube will seal the blow-out hole against any obtrusion through the hole of any portion of the expanded tube and will thus prevent the blow-out from recurring.

To effect this clamping the bar extends across the tread of the blown out casing and is provided at its opposite ends with connecting links hinged to said bar and extending up to the bulge of the casing and said links are connected to the rim by attaching members and take-up means hinged to said links and adjustable with relation thereto so that the bar can be adjusted to a proper distance from the center of the wheel.

An object of this invention is to provide a blow-out clamp which will close the blow-out and hold the walls forming the blow-out.

An object of this invention is to provide a blow-out clamp which will not be subject to undue contact with the road surface when in use.

Another object of this invention is to provide a blow-out clamp which will not be unsightly or disfigure the tire to which it is attached.

Other objects are cheapness, durability, simplicity and lightness.

Other objects, advantages and features of invention may appear from the accompanying drawing, the subjoined detail description and the appended claims.

The accompanying drawing illustrates the invention.

Figure 1 is an end elevation of a blow-out clamp, constructed in accordance with this invention, as applied to an automobile tire which is shown in section. Line $x^1$—$x^1$, Fig. 2 indicates the line of section.

Fig. 2 is a fragmental side elevation of the parts shown in Fig. 1.

Fig. 3 is an enlarged plan view of the inner face of the clamp shown in Figs. 1 and 2, the parts being in extended position.

Fig. 4 is a section on line $x^4$, Fig. 3.

Fig. 5 is a section on line $x^5$, Fig. 3.

Fig. 6 is an end elevation of a modification of this invention, as applied to a straight bead automobile tire which is shown in section.

This invention comprises the clamp 1 which is adapted to cooperate with a patch A inserted in a tire casing 2 so as to hold said tire casing in position to close the blow-out 3 and prevent the inner tube 4 from protruding into the orifice caused by the blow-out 3.

The clamp 1 comprises a bar 5 which is semi-circular in cross section and terminates at its opposite ends in upwardly extending curved arms 6, 7. These arms are respectively connected with the rim 19 by connecting links 8 composed of opposite members 9, 10, which are pivoted at one end to one end of the arm 6 as indicated at 11, and are pivoted by pivots 15 and connected to attaching members 12 adapted to be connected to the rim 19. The arm 7 is connected to rim 19 in like manner as the arm 6 through the pivot 211, the link 28, the pivots 215, the flanges 214 connected by the connections 216, 217, 214, 218, 212, 213 to the rim 19. The drawings show the construction on both sides of the bar 5 to be practically the same. It is important that one or the other of the sides comprise members equivalent to the links 8 and attaching member 12.

The attaching members 12 are provided at their ends with flanges or anchors 13 and outwardly extending flanges 14, and are pivotally connected at 15 to the links 8 by means of the connections 16 engaging the flanges 14. The connections 16 comprise the hinge and take-up means at the bolt members 17, 18.

The attaching members, links and ends of the bar are proportionately curved so that when the clamp is attached in position on the rim of an automobile wheel to close a blow-out in the tire casing, the bolts 18 will be tightened causing the bar 5 to be embedded in the tread of the tire casing which will cause the side walls of the casing to expand transversely until it contacts with the members forming the clamp. The curvature of these members causes the side walls of the casing to be moved downward and inward so that the walls of the blow-out will be forced towards one another to prevent the blow-out from becoming larger.

In practical operation for patching a blow-out in a pneumatic tire the casing 2 will be removed from the rim 19 of the wheel and a thin piece of rubber 20 will be placed over the orifice forming the blow-out 3.

A thin piece of fabric 21 is superimposed over the rubber strip 20 and is sufficiently large to overlap the edges of the rubber 20. The rubber 20 and fabric 21 reduces to a minimum the liability of the inner tube from being forced into the crevice forming the blow-out, and of water entering the tire through the blow-out. The inner tube will then be inserted into the casing 2 and the tire replaced on the rim. One of the attaching members 12 will be positioned so that its anchor or flange 13 engages the inwardly extending edge or bead 22 of the rim 19. The other attaching member will be disengaged from its cooperating connecting link by loosening the bolt 18, and the disengaged attaching member will then be positioned so that its anchor or flange 13 engages the inwardly extending edge or bead 22 of the rim 19 at a point opposite the first mentioned attaching member.

The bolts 18 will then be inserted through the orifices provided therefor in the hinge members 17 and flanges 14. The bolts 18 will then be tightened so as to embed the bar 5 in the tread of the tire casing and the inner tube is then inflated which forces the tire casing to expand around the bar 5.

It is thus seen that I have provided a clamp having anchors adapted to engage the rim of a wheel and a flexible connection between said anchors comprising the bar and connecting links, and that portions of said clamp are adapted to be embedded in the periphery of the tire.

In the form illustrated in Fig. 6, I have shown a clamp 1, adapted for use in connection with a straight bead tire and comprises the bar 5 having connecting links 8, 8′ and 8″ pivoted to the upwardly extending arms 6, 7, and to each other as at 11, 11′ and 11″, respectively.

The link 8″ has a flange $a$ to which the hinge member 17 is detachably secured by the bolt member 18.

The attaching members 12 are pivotally connected to the hinge member 17 as at 15 and have inwardly extending flanges 13 which are interposed between the bead of the tire and the rim 19 of the wheel.

The clamp shown in Fig. 6 is attached in practically the same manner as described for that shown in Figs. 1–5 except the flanges 13 are arranged so as to engage the tire as shown.

An advantage of this blow-out clamp is that a set of four may be conveniently carried in the usual tool box with minimum of space.

I claim:

1. A blow-out clamp substantially as set forth comprising a bar; links pivoted to the ends of said bar; hinges pivoted to said links; attaching members cooperating with said hinges and each having a flange at its ends, one of which flanges is adapted to engage the rim of a wheel and the other of which flanges is adapted to be held in fixed relation to its cooperating hinge.

2. In a device of the character set forth, a clamp comprising a bar adapted to engage the periphery of a tire; means pivotally connected at one end to one end of said bar and adapted at its other end to engage the rim of a wheel; a link pivotally connected to the other end of said bar; and an attaching member connected at one end to said link and adapted at its other end to engage the rim of a wheel for the purpose specified.

3. In combination with a rim, a tire casing having a blow-out hole therein, an inflated tube in said casing, and a patch inserted within the tire casing and extending over and around the blow-out hole; of a clamp having a bar adapted to engage the periphery of the tire casing over said hole and adjustable means connected to said bar and adapted to be held between said rim and said tire casing and adapted to direct the force of expansion within the tire casing to prevent spreading of the walls from the blow-out and thereby cooperating with the tire casing and the patch to confine the inflated pneumatic tube.

In testimony whereof, I have hereunto set my hand at Los Angeles, California, this 24th day of February, 1922.

THOMAS HARVEY McDONALD.

Witness:
JAMES R. TOWNSEND.